(12) United States Patent
Schier et al.

(10) Patent No.: US 6,973,426 B1
(45) Date of Patent: Dec. 6, 2005

(54) METHOD AND APPARATUS FOR PERFORMING SPEAKER VERIFICATION BASED ON SPEAKER INDEPENDENT RECOGNITION OF COMMANDS

(75) Inventors: John E. Schier, Austin, TX (US); Patrick E. Jackson, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 587 days.

(21) Appl. No.: 09/752,043

(22) Filed: Dec. 29, 2000

(51) Int. Cl.[7] ............................................. G10L 15/00
(52) U.S. Cl. ...................................... 704/246; 704/275
(58) Field of Search ............................... 704/197, 275, 704/270, 273, 246

(56) References Cited

U.S. PATENT DOCUMENTS

| | | | |
|---|---|---|---|
| 4,757,525 A * | 7/1988 | Matthews et al. ......... | 379/88.26 |
| 4,896,346 A * | 1/1990 | Belfield et al. ......... | 379/88.02 |
| 5,127,043 A * | 6/1992 | Hunt et al. ............. | 379/88.02 |
| 5,752,231 A * | 5/1998 | Gammel et al. ............ | 704/273 |
| 5,774,858 A * | 6/1998 | Taubkin et al. ............ | 704/273 |
| 5,832,063 A | 11/1998 | Vysotsky et al. ............ | 379/88 |
| 5,893,902 A * | 4/1999 | Transue et al. ............ | 704/275 |
| 6,076,055 A | 6/2000 | Bossemeyer, Jr. et al. .. | 704/250 |
| 6,081,782 A * | 6/2000 | Rabin ........................ | 704/275 |
| 6,094,632 A | 7/2000 | Hattori ...................... | 704/239 |
| 6,119,084 A | 9/2000 | Roberts et al. ............. | 704/246 |
| 6,160,877 A * | 12/2000 | Tatchell et al. ............ | 379/197 |

* cited by examiner

*Primary Examiner*—Daniel Abebe
(74) *Attorney, Agent, or Firm*—Baker Botts L.L.P.

(57) ABSTRACT

A method and apparatus for performing speaker verification with speaker verification templates are disclosed. A verification unit receives an utterance from a speaker. The verification unit identifies a command associated with the utterance by performing speaker independent recognition. If a speaker verification template associated with the identified command includes adequate verification data, the verification unit eliminates a prompt for a password and verifies the speaker identity by comparing the utterance with a speaker verification template associated with the identified command.

23 Claims, 2 Drawing Sheets

| 40 | 42 | 44 | 46a | 46b | 46c |
|---|---|---|---|---|---|
| CALLER | PASSWORD | ADDRESS | COMMAND 1 | COMMAND 2 | COMMAND 3 |
| JOHN DOE | APPLE | 1.160.10.240<br><br>512-555-1234 | SIR 47a<br>SVT 48a | SIR 47b<br>SVT 48b | SIR 47c<br>SVT 48c |
| JANE DOE | ORANGE | 1.320.116.12<br><br>512-555-5678 | SVT 49a | SVT 49b | SVT 49c |

METHOD AND APPARATUS FOR PERFORMING SPEAKER VERIFICATION BASED ON SPEAKER INDEPENDENT RECOGNITION OF COMMANDS

TECHNICAL FIELD OF THE INVENTION

This invention relates in general to speaker verification, and more particularly to a method and apparatus for performing speaker verification based on speaker independent recognition of commands.

BACKGROUND OF THE INVENTION

Interactive voice response (IVR) systems typically collect data in conjunction with a telephone call. A caller may respond to recorded prompts in order to access information associated with the caller. Conventional systems require that the caller input a password to provide verification of the caller's identity. The password may be entered through keying in a series of dual tone multi-frequency (DTMF) digits from the telephone keypad or may be a series of numbers and/or letters spoken by the caller.

If the password is spoken by the caller, the caller's identity may be verified using speaker verification. In speaker verification, the spoken password is compared against a registration database of speaker templates. Some IVR systems may use speaker independent recognition techniques that compare the spoken password with a composite template that represents that same word spoken by a number of different people. Other IVR systems may use speaker dependent recognition techniques that compare the spoken password with a template unique to the caller. Unlike a speaker independent system, a speaker dependent system requires the caller to train the system to recognize his or her voice.

SUMMARY OF THE INVENTION

In accordance with the teachings of the present invention, the disadvantages and problems associated with speaker verification have been substantially reduced or eliminated. In a particular embodiment, a method for performing speaker verification based on speaker independent recognition of commands is disclosed that identifies an utterance by performing speaker independent recognition and verifies the speaker identity by comparing the identified utterance with a speaker verification template associated with the utterance.

In accordance with one embodiment of the present invention, a method for performing speaker verification based on speaker independent recognition of commands includes receiving an utterance from a speaker and identifying a command associated with the utterance by performing speaker independent recognition. A prompt for a password from the caller is eliminated if a speaker verification template includes adequate verification data. The method verifies the speaker identity by comparing the utterance with the speaker verification template associated with the identified command.

In accordance with another embodiment of the present invention, a speaker verification unit includes a network interface for coupling to a communication network, a database and a processing module. The database couples to the line interface and includes a plurality of speaker verification templates associated with a plurality of commands. The processing module couples to the line interface and receives a command from a speaker. The processing module identifies the command by performing speaker independent recognition. If a speaker verification template associated with the identified command includes adequate verification data, the processor eliminates a prompt for a password and verifies the speaker identity by comparing the identified command with the speaker verification templates stored in the database.

Important technical advantages of certain embodiments of the present invention include a speaker verification unit that eliminates the need for a formal training session. Conventional speaker verification systems require a speaker to perform a training session in which the speaker repeats numbers and words to create speaker dependent templates. The speaker verification unit of the present invention utilizes words and/or phrases frequently used by the speaker to transparently verify the caller's identity. When the caller accesses the verification unit for the first time, the caller provides a password to the verification unit. The verification unit records voice patterns for the words that are normally used by the caller in interacting with the system to create a speaker verification template for each of the words. Once the verification unit collects enough information to create the speaker verification templates, the speaker does not have to provide the password because the system may verify the identity of the speaker by comparing the spoken words with the speaker verification templates.

Another important technical advantage of certain embodiments of the present invention includes a speaker verification unit that reduces the possibility of an imposter accessing an interactive voice response (IVR) system using another caller's identity. After the initial "training period," a speaker is not required to use a password to access the system. In order for the imposter to access the system, the imposter must imitate the speaker's voice and use the utterances associated with the speaker. The imposter, therefore, cannot access the system by knowing the caller's password once the valid user has transparently trained the system.

Other technical advantages will be readily apparent to one skilled in the art from the following figures, descriptions, and claims.

DETAILED DESCRIPTION OF THE INVENTION

Figures 1, 2:
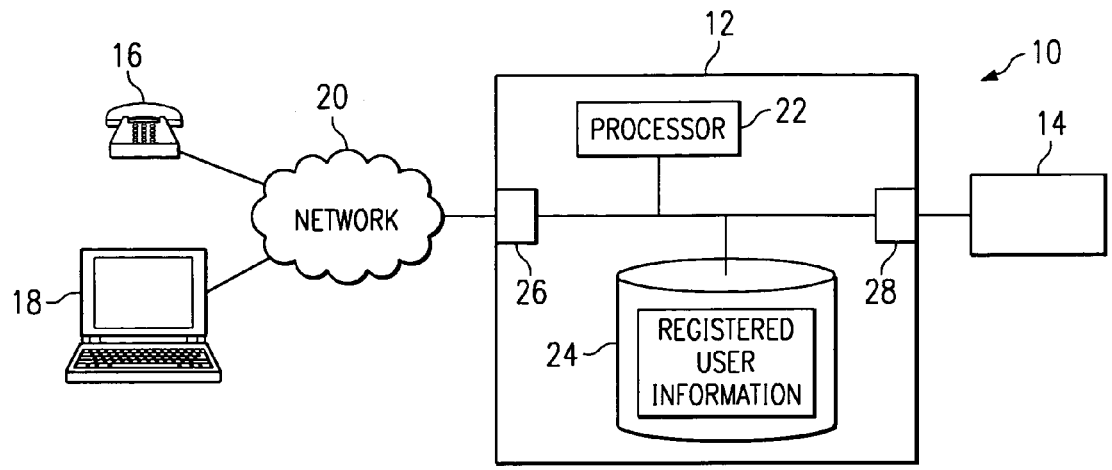
FIG. 1 illustrates a communication network in accordance with one embodiment of the present invention.
FIG. 2 illustrates a table for storing speaker verification templates associated with a plurality of utterances for a registered speaker.

FIG. 1 illustrates a communication network that supports verification of a speaker identity based on speaker independent recognition of commands. System 10 includes clients 16 and 18 (generally referred to as clients 16) coupled to network 20 and verification unit 12 coupled between network 20 and server 14. Verification unit 12 receives utterances from callers at clients 16 over network 20 and identifies commands associated with the utterances by performing speaker independent recognition. Verification unit 12 verifies the identities of the callers at clients 16 by comparing the identified utterances with the respective speaker verification templates transparently created during previous sessions conducted with the callers.

Network 20 may be a local area network (LAN), a wide area network (WAN), the Internet or other similar network that transmits packets of voice, video, data and other information (generally referred to as media). For example, network 20 may be an Internet Protocol (IP) network, a Frame Relay network, an Asynchronous Transfer Mode (ATM) network, or any other packet-based network that allows transmission of audio and video telecommunication signals, as well as traditional data communications. In alternative embodiments, network 20 may be an analog or digital circuit-switched network, such as a private branch exchange (PBX) or the public switched telephone network (PSTN). Although the invention will be described primarily with respect to IP data communications, it should be understood that other appropriate methods of transmitting telecommunication signals over a network are included within the scope of the invention.

IP networks and other packet-based networks typically transmit media by placing the data in cells, packets, frames, or other portions of information (generally referred to as packets) and sending each packet individually to the selected destination. The technology that allows voice media in particular to be transmitted over a packet-based network may be referred to as Voice over Packet (VoP). Clients 16 have the capability to encapsulate a user's voice or other content into IP packets so that the content may be transmitted over network 20. Clients 16 may, for example, include cordless or cellular telephones, personal digital assistants (PDAs), or other wireless devices. Also, clients 16 may include telephony software running on a computing device, traditional plain old telephone (POTS) devices, analog phones, digital phones, IP telephony devices, or other computing and/or communication devices that communicate media using analog and/or digital signals. Clients 16 may also include dual tone multi-frequency (DTMF) signaling capabilities initiated through depression of one or more keys of a keypad on each of clients 16.

Server 14 may be an interactive voice response (IVR) system, an automated attendant, or any suitable system that allows a user to access services based on speech commands. The services available from server 14 may include, but are not limited to, call functions, such as voice messaging, call forwarding, call redial, and personal telephone directories, banking services, credit card services, or other suitable services that may be confidential and/or personal in nature.

Verification unit 12 receives an utterance from a caller at client 16, identifies a command associated with the utterance, and verifies the identity of the caller by comparing the utterance with a speaker verification template (SVT). Verification unit 12 includes network interface 26 coupled to network 20, service interface 28 coupled to server 14, processor 22 and database 24. Processor 22 may be one or a combination of a microprocessor, a microcontroller, a digital signal processor (DSP), or any other suitable digital circuitry configured to process information. Database 24 stores information associated with callers at clients 16. The information may include addresses for clients 16, passwords used by callers, commands used by callers, speaker independent templates for each command, SVTs for each caller, and any other suitable information used by processor 22 to verify the callers' identities.

Processor 22 performs speaker verification using speaker independent recognition (SIR) of utterances from callers at clients 16 combined with speaker verification algorithms. SIR techniques may be used to recognize speech for multiple speakers. In SIR systems, a composite template or cluster of templates are created for utterances that may be used by the multiple speakers to interact with the system. The templates are derived from numerous samples of voice patterns from the multiple speakers, which represent a wide range of pronunciations. In contrast to SIR techniques, speaker dependent recognition (SDR) techniques may be used to recognize the speech for a single speaker's voice. In conventional SDR systems, the speaker trains the system by speaking a sound to generate an analog speech input. The speaker repeats the sound a specific number of times, e.g., eight times, during the training process because a sound spoken by the same person, but at a different time, may generate a different analog speech input. Each of the different speech inputs is averaged by the system to create a speaker dependent template for the spoken sound. The speaker then repeats the training process for each utterance that the speaker uses in interacting with the SDR system. In one embodiment, this type of training may be used to create SVTs for use with speaker verification algorithms.

When a caller at client 16 initiates a call over network 20, processor 22 obtains the address associated with client 16. In one embodiment, processor 22 may use automatic number identification (ANI) to obtain the address for client 16. For example, using ANI processor 22 may examine IP packets communicated from a data network or telephone numbers communicated over a trunk or a line of the PSTN to obtain a series of digits. The series of digits, either in analog or digital form, may represent the telephone number or IP address associated with client 16. Processor 22 then uses the telephone number or IP address as an index to a table stored in database 24 in order to retrieve information about the caller at client 16.

If the table contains the address obtained from client 16, processor 22 determines if database 24 contains adequate verification data for the caller at client 16. In one embodiment, the table may contain a predetermined number of commands that are associated with the caller at client 16. Processor 22 may determine that there is adequate verification data for the caller at client 16, when the SVTs associated with the caller have been updated at least three times for at least three of the commands in the table. In an alternative embodiment, the table may initially contain no commands that are associated with the caller at client 16. In this example, processor 22 may determine that there is adequate verification data for the caller at client 16 when a minimum number of commands are associated with the caller and the respective SVTs for the caller have been updated at least three times. The minimum number of commands required may be three or any other number that allows processor 22 to accurately verify the identity of the caller at client 16.

If database 24 contains adequate verification data for the caller at client 16, processor 22 prompts the caller to speak. In one embodiment, the caller may speak upon receiving a dial tone. In an alternative embodiment, the caller may speak upon hearing a sound, such as a beep, after the dial tone. Processor 22 samples and digitizes the audio speech, if it is not already digitized, to create a digital signal that represents the spoken utterance. Each command available for use in the system may have an SIR template associated with it. Processor 22 compares the digitized signal with each of the SIR templates to identify the command.

Once processor 22 identifies the command spoken by the caller at client 16, processor 22 accesses database 24 to obtain the SVT created by the caller for the identified command. In one embodiment, each command has one SVT for each registered caller. Processor 22 compares the digitized signal with the SVT for the command to verify the caller's identity. If the command matches the SVT associated with the caller, processor 22 verifies the identity of the caller at 16 and updates the SVT with the digitized signal associated with the most recent accepted utterance. For example, the SVT may be updated by performing a Fast Fourier Transform that provides a matrix of signal energy levels for a number of frequency bands crossed by time. An average template may be created by averaging the values across the new sample and the existing template, with a higher weighting given to the most recent successfully verified utterance, and the lowest weighting given to the oldest successfully verified utterance. In this manner, the system "tracks" changes in the caller's voice over time and adapts the SVT to the voice changes. After verifying the identity of the caller and updating the SVT associated, processor 22 executes the identified command by accessing server 14 to obtain the corresponding services.

FIG. 2 illustrates a table stored in database 24 that includes registered speaker information associated with callers at clients 16. Although FIG. 2 illustrates a table containing specific information, it should be recognized that the table may contain any suitable information used to verify the identity of the registered callers. Caller 40 includes the names of the registered callers associated with network 20 and verification unit 12. Password 42 includes the passwords used by the registered callers. The passwords may be any combination of letters, numbers, or other suitable characters that may be spoken, entered on a keypad of a touch-tone phone, entered on a keyboard associated with a personal computer, or any other suitable entry techniques. In one embodiment, the length of the password may be between approximately six and thirty-two characters.

Address 44 includes the addresses associated with the callers at clients 16. The addresses may include IP addresses, telephone numbers, or any other suitable information that may be used to identify client 16. Multiple addresses may be associated with one caller since the caller may access the system from any of clients 16. For example, caller "John Doe" may access system 10 using a computer running telephony software (e.g., client 18) and communicating across a packet-based network (e.g., network 20). The IP address for client 18 may be prestored in address 44 for the caller. In this example, the caller would not have to enter a password since the address obtained through ANI by processor 22 would match an address stored in database 24. If "John Doe" accesses system 10 from a conventional telephone (e.g., client 16) that communicates across the PSTN (e.g., network 20, the telephone number associated with client 16 may not be stored in address 44 for the caller. In this case, the caller may be prompted for a password. If the entered password matches the password stored in database 24 for the caller, processor 22 adds the telephone address for client 16 to address 44 for "John Doe."

Command 46 may contain SIR templates 47 for each command available in the system and SVTs 48 for each command that is unique to the registered callers. In one embodiment, a predetermined number of commands may be used in the system. SIR templates 47 associated with each command may be created by obtaining numerous samples of speech from multiple speakers and averaging the samples to create an SIR template that represents a wide range of pronunciations. SIR templates 47 are stored in commands 46 in database 24 before any registered callers access the system.

When a caller accesses the system for the first time, the caller is asked for a password. If the password verifies the caller's identity, the caller speaks a command. Processor 22 identifies the command by converting the command into a digitized signal, if the command is not already digitized, and comparing the digitized signal with the SIR templates in commands 46. Once processor 22 identifies the command using SIR techniques, processor 22 creates SVTs 48 and 49 from the digitized signal and stores SVT 48 in commands 46 associated with caller "John Doe" and SVT 49 in commands 46 associated with caller "Jane Doe." If caller "John Doe" subsequently accesses system 10 by using the same command, processor 22 identifies the command by comparing the digitized signal to SIR templates 47 in commands 46. Processor 22 then updates SVT 48 by averaging the digitized signal with stored SVT 48 in commands 46 to create an average template. In one embodiment, processor 22 creates the average template by keeping track of the number of times that the caller has used the command and updates SVT 48 by giving the digitized signal a weighting proportional to the number of times that the caller has used the command. Average SVT 48 is stored in commands 46 for the caller at client 16. The process of updating SVT 48 occurs each time the caller uses a given command when accessing system 10.

Figure 3:
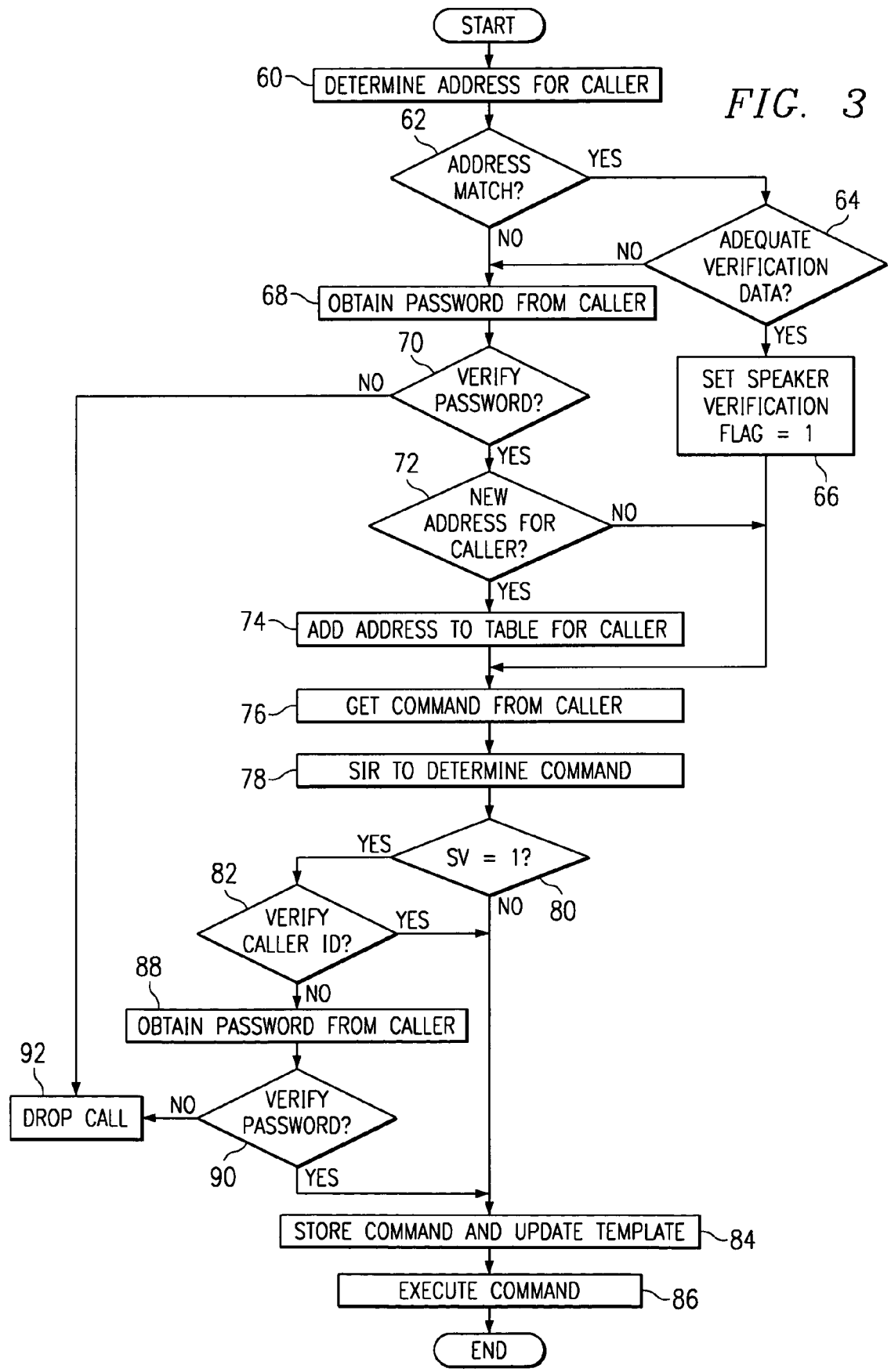
FIG. 3 illustrates a flowchart of a method for performing speaker verification based on speaker independent recognition of commands.

FIG. 3 illustrates a flowchart of a method for performing speaker verification based on speaker independent recognition of commands. Each time the caller accesses system 10, verification unit 12 verifies the identity of the caller. When the caller accesses system 10 enough to create adequate verification data, verification unit 12 uses the commands spoken by the caller to verify the identity of the caller. Once the identity of the caller has been verified by verification unit 12, the caller may access the services in server 14.

At step 60, processor 22 determines the address for the caller at client 16. Processor 22 may determine the address for client 16 by using ANI, by examining the packets of media, by identifying the trunk or line associated with the call, or any suitable technique for determining the location of client 16 on network 20. The determined address is compared with address 44 in a table stored on database 24 at step 62. If the address matches one of the addresses associated with the caller, processor 22 determines if there is adequate verification data for the caller at step 64. In one embodiment, adequate verification data for the caller may include at least three different commands and the associated SVTs for the caller that have been updated at least three times. If there is adequate verification data associated with the caller at client 16, processor 22 sets a speaker verification (SV) flag, at step 66, to indicate that the identity of the caller may be verified using the SVTs stored in database 24.

At step 62, if the address does not match one of the addresses associated with the caller, processor 22 prompts the caller for a unique password. The caller may also be prompted for the password if processor 22 determines that there is not adequate data information for the caller at step 64. In one embodiment, a unique password for each registered caller may be stored in database 24 so that the identity of the caller may be verified when the caller accesses system 10 from any of clients 16. Processor 22 obtains the password from the caller at step 68 and verifies the identity of the caller by comparing the password with a password stored in database 24 for the caller at step 70. If processor 22 verifies the identity of the caller at client 16, processor 22 determines if address obtained at step 60 matches the addresses stored in address 44 on database 24 that are associated with the caller at step 72. If the obtained address does not match any of the addresses in database 24, processor 22 updates address 44 to include the new address at step 74.

If the address does match one of the addresses stored in database 24 for the caller, processor 22 prompts the caller to speak an utterance at step 76. This utterance could be any one of a set of commands appropriate at this point in the call flow. Processor 22 also prompts the caller to speak the utterance after setting the SV flag at step 66. Processor 22 converts the audio speech from the caller into a digitized signal, if the signal is not already digitized, and performs SIR to determine the command associated with the utterance at step 78. Processor 22 performs SIR by comparing the digitized signal with the SIR templates stored in database 24.

Once the command is located in database 24, processor 22 reads the SV flag at step 80. If the SV flag indicates that database 24 contains adequate data information for the caller, processor 22 verifies the identity of the caller by comparing the digitized signal generated from the utterance with SVTs associated with the caller at step 82. If the digitized signal matches one of the SVTs for a command associated with the caller, processor 22 updates the matching SVT, at step 84, by giving the digitized signal a weighting proportional to the number of times that the caller has used the command and averaging the digitized signal with the existing SVT. The SVT associated with the caller may also be updated if the SV flag indicated that there was not adequate verification data for the caller at step 80, but the identity of the caller was verified using a password at step 70. Once the caller has been verified, processor 22 executes the command at step 86, and accesses the services associated with the command on server 14.

If processor 22 fails to verify the identity of the caller by comparing the digitized signal generated from the utterance with the SVT associated with the command for the caller, processor 22 prompts the caller for a password at step 88. In one embodiment, processor 22 may prompt the caller to speak the command a second time if processor 22 cannot verify the caller's identity. The caller may repeat the command a maximum number of times, e.g., four times, before processor 22 prompts the caller to enter a password. Processor 22 verifies the identity of the caller at step 90 by using the caller's password and updates the SVT at step 84 if the verification is successful. If the verification is not successful, processor 22 indicates to the caller at client 16 that the caller cannot access the system and terminates the session. The session may also be terminated if the identity of the caller may not be verified at step 70.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for performing speaker verification based on speaker independent recognition of commands, the method comprising:
   receiving, from a client, an utterance spoken by a speaker;
   identifying a user associated with the client;
   identifying a command associated with the utterance by performing speaker independent recognition (SIR);
   determining whether a speaker verification template associated with the identified command includes adequate verification data to verify utterances of the identified command by the identified user;
   eliminating a prompt for a password if the speaker verification template associated with the identified command includes adequate verification data; and
   verifying a speaker identity by comparing the utterance with the speaker verification template associated with the identified command.

2. The method of claim 1, further comprising recording speaker dependent voice patterns associated with the utterance to create the speaker verification template.

3. The method of claim 1, further comprising:
   recording speaker dependent voice patterns associated with the utterance to create the speaker verification template; and
   executing the identified command if the utterance matches the speaker verification template.

4. The method of claim 1, further comprising:
   prompting the speaker to enter a password if the utterance does not match the speaker verification template; and
   verifying the speaker identity based on the password.

5. The method of claim 1, further comprising:
   prompting the speaker to enter a password if the utterance does not match the speaker verification template;
   verifying the speaker identity based on the password;
   recording speaker dependent voice patterns associated with the utterance to create the speaker verification template; and
   executing the identified command.

6. The method of claim 1, further comprising:
   prompting the speaker for a password if the speaker verification template associated with the identified command does not comprise adequate verification data; and
   verifying the speaker identity based on the password.

7. The method of claim 1, further comprising:
   prompting the speaker for a password if the speaker verification template associated with the identified command does not comprise adequate verification data;
   verifying the speaker identity based on the password;
   recording speaker dependent voice patterns associated with the utterance to create the speaker verification template; and
   repeating the prompting, verifying and recording steps until the speaker verification template associated with the identified command comprises adequate verification data.

8. A speaker verification unit, comprising:
   a network interface operable to couple to a communication network;
   a database coupled to the network interface, the database comprising a plurality of speaker verification templates associated with a plurality of commands; and
   a processing module coupled to the network interface, the processing module operable to:
   receive, from a client, an utterance spoken by a speaker;
   identify a user associated with the client;
   identify a command associated with the utterance by performing speaker independent recognition (SIR);
   determine whether a speaker verification template associated with the identified command includes adequate verification data to verify utterances of the identified command by the identified user;
   eliminate a prompt for a password if the speaker verification template associated with the identified command includes adequate verification data; and verify a speaker identity by comparing the utterance with the speaker verification template associated with the identified command.

9. The speaker verification unit of claim 8, wherein the processing module is further operable to:
record speaker dependant voice patterns associated with the utterance; and
store the speaker dependent voice patterns in the database to create the speaker verification template associated with the identified command.

10. The speaker verification unit of claim 8, further comprising a service interface operable to couple to a server comprising a plurality of services associated with the commands.

11. The speaker verification unit of claim 10, wherein the processing module is further operable to:
record speaker dependent voice patterns associated with the utterance;
store the speaker dependent voice patterns in the database to create the speaker verification template associated with the identified command; and
access a service associated with the identified command from the server.

12. The speaker verification unit of claim 8, wherein:
the database further comprises a password associated with the user; and
the processing module is further operable to:
prompt the speaker to enter the password if the utterance does not match the speaker verification template;
compare the entered password with the password stored in the database; and
verify the speaker identity if the entered password matches the password stored in the database.

13. The speaker verification unit of claim 8, wherein:
the database further comprises a password associated with the user; and
the processing module is further operable to:
prompt the speaker to enter the password if the utterance does not match the speaker verification template;
compare the entered password with the password stored in the database;
verify the speaker identity if the entered password matches the password stored in the database;
record speaker dependent voice patterns associated with the utterance; and
store the speaker dependent voice patterns in the database to create the speaker verification template associated with the identified command.

14. The speaker verification unit of claim 8, wherein:
the database further comprises a password associated with the user; and
the processing module is further operable to:
prompt the speaker to enter the password if the speaker verification template does not comprise adequate verification data;
compare the entered password with the password stored in the database; and
verify the speaker identity if the entered password matches the password stored in the database.

15. The speaker verification unit of claim 8, wherein:
the database further comprises a password associated with the user; and
the processing module is further operable to:
prompt the speaker to enter the password if the speaker verification template does not comprise adequate verification data;
compare the entered password with the password stored in the database;
verify the speaker identity if the entered password matches the password stored in the database;
record speaker dependant voice patterns associated with the utterance; and
store the speaker dependent voice patterns in the database to create the speaker verification template associated with the identified command.

16. The speaker verification unit of claim 8, wherein the command is selected from the group consisting essentially of call, store, access, forward, or redial.

17. Logic encoded in media for performing speaker verification based on speaker independent recognition of commands and operable to perform the following steps:
receiving, from a client, an utterance spoken by a speaker;
identifying a user associated with the client,
identifying a command associated with the utterance by performing speaker independent recognition (SIR);
determining whether a speaker verification template associated with the identified command includes adequate verification data to verify utterances of the identified command by the identified user;
eliminating a prompt for a password if the speaker verification template associated with the identified command includes adequate verification data; and
verifying a speaker identity by comparing the utterance with the speaker verification template associated with the identified command.

18. The logic encoded in media of claim 17, further comprising:
recording speaker dependent voice patterns associated with the utterance to create the speaker verification template; and
executing the identified command if the utterance matches the speaker verification template.

19. The logic encoded in media of claim 17, further comprising:
prompting the speaker to enter a password if the utterance does not match the speaker verification template;
verifying the speaker identity based on the password;
recording speaker dependent voice patterns associated with the utterance to create the speaker verification template; and
executing the identified command.

20. The logic encoded in media of claim 17, further comprising:
prompting the speaker for a password if the speaker verification template associated with the identified command does not comprise adequate verification data;
verifying the speaker identity based on the password;
recording speaker dependent voice patterns associated with the utterance to create the speaker verification template; and
repeating the prompting, verifying and recording steps until the speaker verification template associated with the identified command comprises adequate verification data.

21. An apparatus for performing speaker verification based on speaker independent recognition of commands:
means for receiving, from a client, an utterance spoken by a speaker;

means for identifying a user associated with the client;

means for identifying a command associated with the utterance by performing speaker independent recognition (SIR);

means for determining whether a speaker verification template associated with the identified command includes adequate verification data to verify utterances of the identified command by the identified user;

means for eliminating a prompt for a password if the speaker verification template associated with the identified command includes adequate verification data; and means for verifying a speaker identity by comparing the utterance with the speaker verification template associated with the identified command.

22. The apparatus of claim 21, further comprising:

means for recording speaker dependent voice patterns associated with the utterance to create the speaker verification template; and means for executing the identified command if the utterance matches the speaker verification template.

23. The apparatus of claim 21, further comprising:

means for prompting the speaker for a password if the speaker verification template associated with the identified command does not comprise adequate verification data;

means for verifying the speaker identity based on the password;

means for recording speaker dependent voice patterns associated with the utterance to create the speaker verification template; and means for repeating the prompting, verifying and recording steps until the speaker verification template associated with the identified command comprises adequate verification data.

* * * * *